United States Patent [19]
Krauth

[11] Patent Number: 5,030,279
[45] Date of Patent: Jul. 9, 1991

[54] CONTROLLED PERCOLATION METHOD FOR HEAP LEACH MINING

[76] Inventor: Richard G. Krauth, 7466 N. 4th St., Fresno, Calif. 93710

[21] Appl. No.: 646,658

[22] Filed: Jan. 28, 1991

Related U.S. Application Data

[60] Division of Ser. No. 560,369, Jul. 30, 1990, which is a continuation of Ser. No. 116,465, Nov. 3, 1987.

[51] Int. Cl.⁵ ............................................. C22B 3/01
[52] U.S. Cl. .................................... 75/712; 266/101
[58] Field of Search ........................ 266/101; 75/712

[56] References Cited

U.S. PATENT DOCUMENTS

| | | | |
|---|---|---|---|
| 4,473,532 | 9/1984 | Rose | 266/101 |
| 4,739,973 | 4/1988 | Herndon | 266/101 |

*Primary Examiner*—Peter D. Rosenberg
*Attorney, Agent, or Firm*—Phillips, Moore, Lempio & Finley

[57] ABSTRACT

A system for heap leach mining comprises supply and header pipes for conducting leaching solution alongside a bed or "heap" of crushed metal-laden ore deposited on an impervious pad. A series of spaced tubes are connected to the supply header pipes to extend transversely thereof, over the pad, to receive the leaching solution therefrom. A plurality of emitters are connected in spaced relationship along each of the tubes for emitting the leaching solution at a controlled and substantially uniform rate over the pad and into the ore bed. The tubes and emitters can be positioned either on an upper surface of the ore bed or buried beneath such surface, at a predetermined depth. The system and method of this invention provide numerous advantages over conventional surface spraying systems and methods, including substantial cost savings thereover.

10 Claims, 3 Drawing Sheets

CONTROLLED PERCOLATION METHOD FOR HEAP LEACH MINING

This application is a divisional of U.S. patent application Ser. No. 07/560,369, filed on July 30, 1990 by applicant for "Controlled Percolation System And Method For Heap Leach Mining" which is, in turn, a continuation of U.S. patent application Ser. No. 07/116,465, filed on Nov. 3, 1987 by applicant for "Controlled Percolation System and Method for Heap Leach Mining."

TECHNICAL FIELD

This invention relates to hydrometallurgy and more particularly to the application of a leaching solution over a bed of crushed metal-laden ore to separate-out a pregnant solution of metals therefrom.

BACKGROUND OF THE INVENTION

Hydrometallurgy is the art of recovering metals from ores by first effecting solution of the metals in the form of a salt, separating the solution from the impoverished solid, then decomposing the metallic salt in such a way as to cause precipitation of the metal in a state of comparative purity. The leaching solution or lixiviant for reclaiming gold and silver from a bed of low-grade ore generally constitutes aqueous solutions of sodium cyanide mixed with oxygen (air) to convert the noble metal (M) to soluble $NaM(CN)_2$, from which M can be recovered either by precipitation with zinc dust or aluminum powder, carbon absorption, or by electrowinning. Sulfuric acid or sulfuric acid-ferric sulfate is the principle practical copper mineral lixiviant.

The term "heap," as used in the art of hydrometallurgy, means a bed of run-of-mine or granular low-grade ore that has been suitably spread over a prepared surface or "pad" that will ensure solution recovery. The pad is formed as an impervious base, such as by sheets of plastic film (e.g., polyethylene), asphalt and/or compacted clay. The ore is normally heaped onto each impervious pad to a depth of ten to thirty feet, after the ore has been pre-crushed to sufficiently small size to enable the leaching solution to reach the metallic-mineral particles contained in the ore. Gold and silver ores, for example, are run-of-mine or more commonly crushed to 40-200 mesh size with recovery increasing with the increased fineness of the crushed ore. The pad is usually sloped with the pregnant solution recovered for subsequent processing by perforated drain pipes or channels positioned on the impervious base, at the "toe" of the pad.

Lixiviation is the process effecting contact between the ore and the leaching solution. The process is normally accomplished by circulating the solution through the stationary ore mass, commonly known as "percolation." The rate of percolation will depend on a number of factors, such as the particle size of the ore, the depth of the pad, the strength of the leaching solution (e.g., one to four pounds of sodium cyanide per ton of water for recovering gold) and the quantity of leaching solution distributed over the bed of crushed ore per unit area.

Conventional percolation systems for heap leach mining normally include sprayers mounted above the bed of crushed ore which function to spray the leaching solution onto the ore in a non-uniform and uncontrolled manner. The leaching solution is thus prone to rapid evaporation and degradation by its exposure to ultraviolet rays, requiring constant monitoring and replenishing of the leaching solution with added water and/or sodium cyanide. Evaporation is further increased by exposure of the leaching solution to wind friction when it is sprayed through the air.

Surface spraying also induces ice build-up over the pad in freezing weather which in many instances requires complete operation shut-down or a risk of washout or blow-out, as will be appreciated by those skilled in the heap leach mining arts. As an alternative to shutting down the operation, the leaching solution and/or the ore itself may be heated, but at substantial cost. The aforementioned wind factor may give rise to an unsafe working environment for the operating and maintenance personnel and also tends to contaminate the surrounding environment (air, ground water, soil) with the highly toxic leaching solution.

Further disadvantages of conventional surface spraying techniques include the formation of surface ponding and run-off, giving rise to serious channeling problems and potential for blow-outs. Ice melt-downs, ponding and other adverse effects, resulting from uneven solution distribution common to surface spraying, will result in pad channeling. The fines washed-down by solution channels form hard pans that eventually divert and internally erode the ore bed and pad. Should these conditions persist, pad blow-out will oftentimes result.

The sprayers used for surface spraying also require constant repair to unplug their spraying heads. Conventional systems of this type are also unusable when the pad is situated over uneven terrain, due to the above-mentioned channeling and pad blow-out problems.

SUMMARY OF THE INVENTION

A primary object of this invention is to provide an improved percolation system for heap leach mining which overcomes the above, briefly enumerated disadvantages of conventional systems employing surface spraying.

The controlled percolation system of this invention comprises supply means for conducting a leaching solution adjacent to an ore bed composed of crushed metal-laden ore, a plurality of spaced tube means connected to the supply means for receiving the leaching solution therefrom, and a plurality of dripper means positioned in spaced relationship along each of the tube means for directly emitting the leaching solution into the ore bed at a controlled and substantially uniform rate.

BRIEF DESCRIPTION OF THE DRAWINGS

Other objects and advantages of this invention will become apparent from the following description and accompanying drawings wherein.

DESCRIPTION OF THE PREFERRED EMBODIMENTS

General Description

Figure 1:
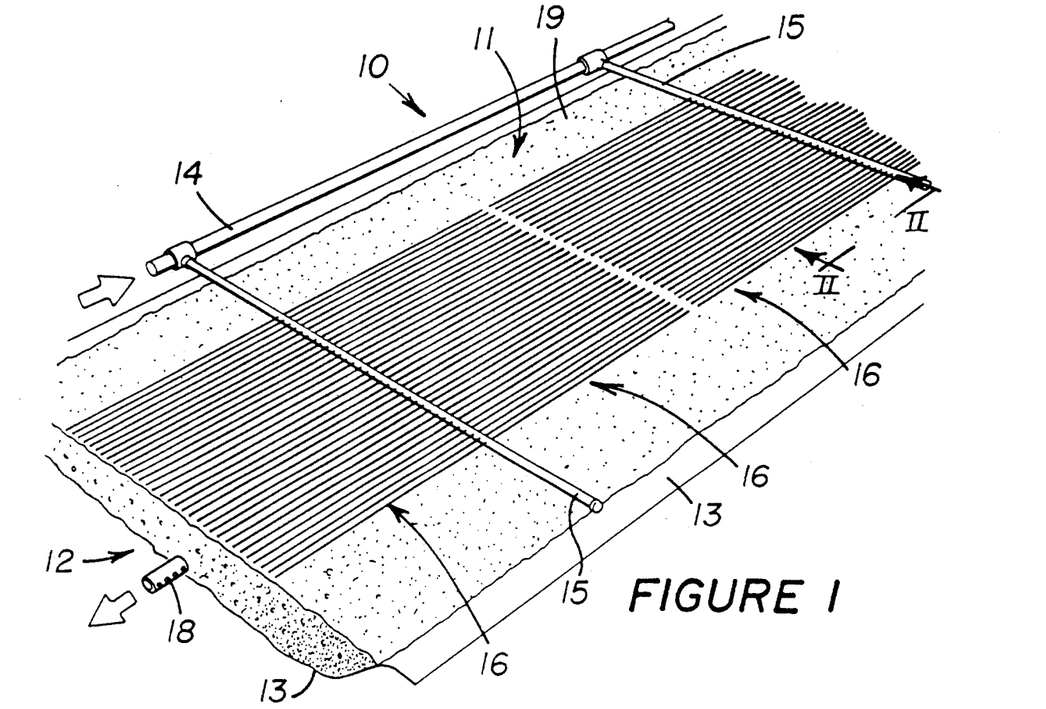
FIG. 1 is a perspective view partially illustrating an ore bed composed of crushed metal-laden ore deposited on an impervious pad and having a controlled percolation system embodiment of this invention disposed thereon.

FIG. 1 illustrates a controlled percolation system 10 of this invention mounted on the upper surface of an ore bed or "heap" 11 composed of crushed metal-laden ore, such as low-grade gold, silver or copper bearing ores. The ore bed is deposited on an pad 12, shown, for example, in the form of one or more plastic sheets 13 which can be placed over an asphalt or compacted clay base. As described above, heap leach mining is typically employed in conjunction with low grade ore that is normally pre-crushed to suitable size and then treated with a leaching solution (lixiviation), such as an aqueous solution of sodium cyanide, potassium cyanide, acidothiourea, ammoniacal thiosulfate or malononitrile in the case of gold and silver. It should be understood that the system and method of this invention are equally applicable to the reclamation of other types of metals, such as copper wherein sulfuric acid or sulfuric acid-ferric sulfate is used as the lixiviant.

The illustrated embodiment of controlled percolation system 10 includes supply means in the form of a mainline pipe 14 and a plurality of header pipes 15 for conducting the liquid leaching solution to separate series of tubes 16, suitably connected to the header pipes. Each tube has a plurality of spaced emitters 17 secured thereon for directly emitting the leaching solution into ore bed 11 at a controlled and substantially uniform rate, in a manner described more fully hereinafter. The pregnant solution is recovered by strategically positioned drain pipes 18 (one shown in FIG. 1) positioned on pad 12. Thereafter, the metals, such as gold, silver or copper, are recovered from the pregnant solution in any well-known conventional manner, such as by precipitation with zinc dust or aluminum powder, carbon absorption or by electrowinning.

DETAILED DESCRIPTION

Mainline pipe 14 is connected to a source of the liquid leaching solution in a conventional manner to receive the solution at a suitable pressure (e.g., 10–100 psi). Emitters 17 may be constructed to be non-pressure compensating or pressure compensating and self-cleaning to maintain a substantially uniform flow rate therefrom, independent of upstream pressure fluctuations. The mainline and header pipes are preferably constructed from a standard plastic material, such as a semirigid polyvinylchloride (PVC). A twelve to sixteen inch diameter mainline pipe and six inch diameter header pipes have been found acceptable for this purpose.

Figure 3:
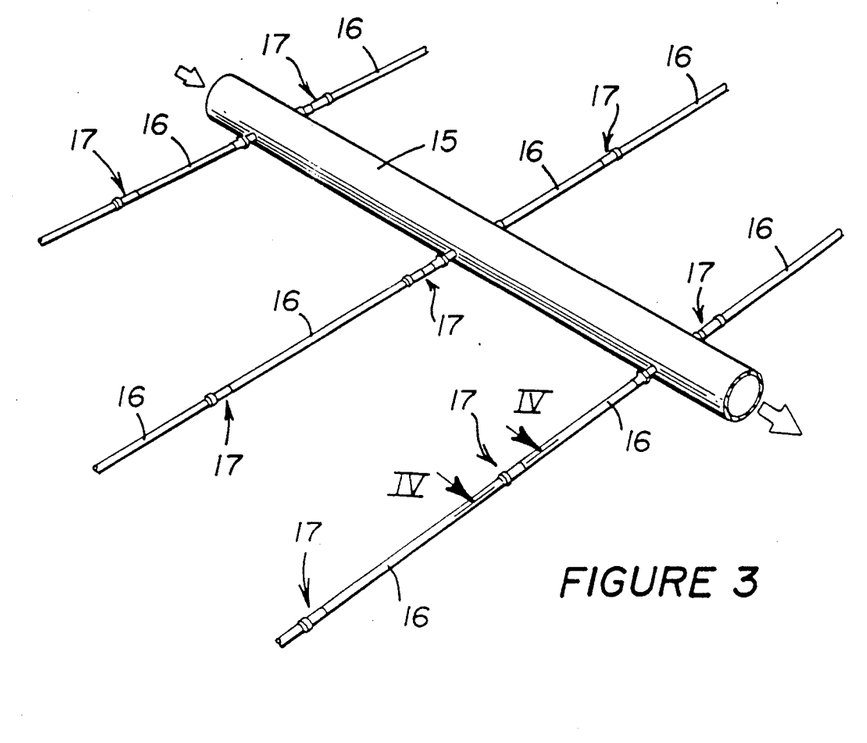
FIG. 3 is an enlarged perspective view illustrating connection of the header pipe to a plurality of tubes.

A series of tubes 16 are connected to one or both sides of a header pipe 15 to extend transversely therefrom. In each series, the generally parallel tubes are preferably spaced apart one from another at a distance selected from the approximate range of from 1.0 ft. to 12.0 ft. (FIG. 3). Tubes 16 are preferably composed of a flexible plastic tubing, such as low density polyethylene, that will exhibit sufficient flexibility to at least generally conform to an irregular upper surface 19 of ore bed 11. Although the diameters of the tubes may vary, in one working embodiment of this invention, each tube had a standard outer diameter of 0.620 in. and an inside diameter of 0.520 in. to facilitate assembly of the system from commercially available components.

Figure 2:
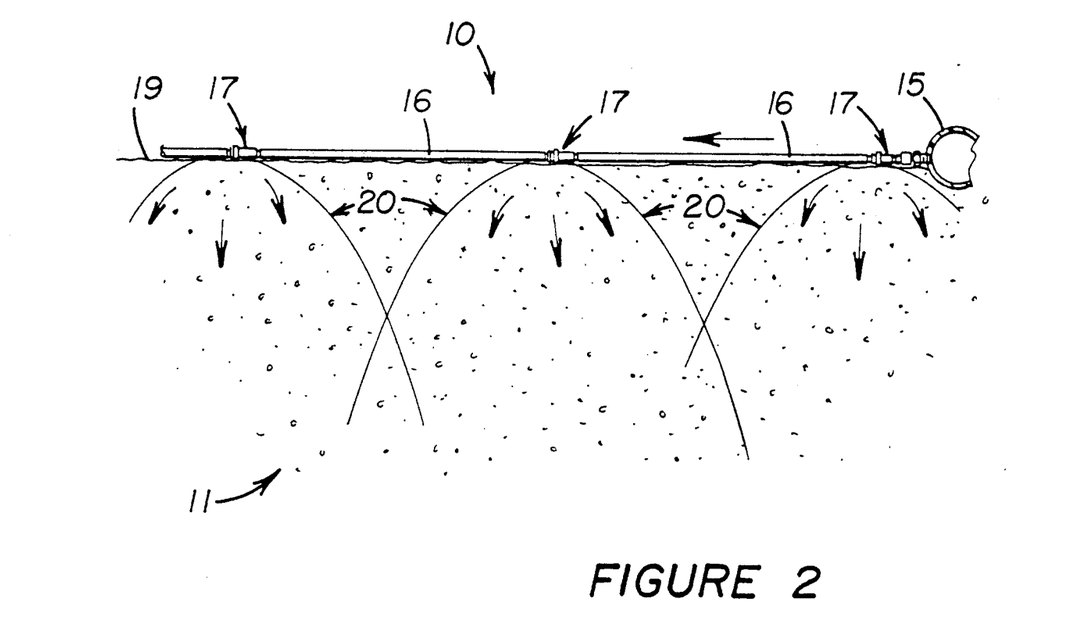
FIG. 2 is an enlarged sectional view in elevation, taken in the direction of arrows II—II in FIG. 1, illustrating a header pipe and one connecting tube having a plurality of emitters for directly emitting a leaching solution onto the ore bed.

As shown in FIG. 2, each tube is positioned on upper surface 19 of ore bed 11 to emit the leaching solution directly into the ore, even though portions of the tubes and emitters 17 may be slightly out of contact with the upper surface of the ore bed due to surface irregularities. The term "emit" (or "emitting") as used herein means a process for dispensing a leaching solution in such a manner that the solution flows or drops down from the dispensing site without being projected horizontally to any substantial extent above ground level (such as in surface spraying) prior to contact with the bed of crushed ore. The leaching solution will typically disperse in a generally umbrella-shaped pattern 20, with the adjacent patterns overlapping as shown. The solution will further penetrate and soak the volume of ore between the patterns under the influence of capillary and related principles influencing fluid flow. Ore bed 11 is normally formed to a depth of from ten to thirty feet.

Figure 4:
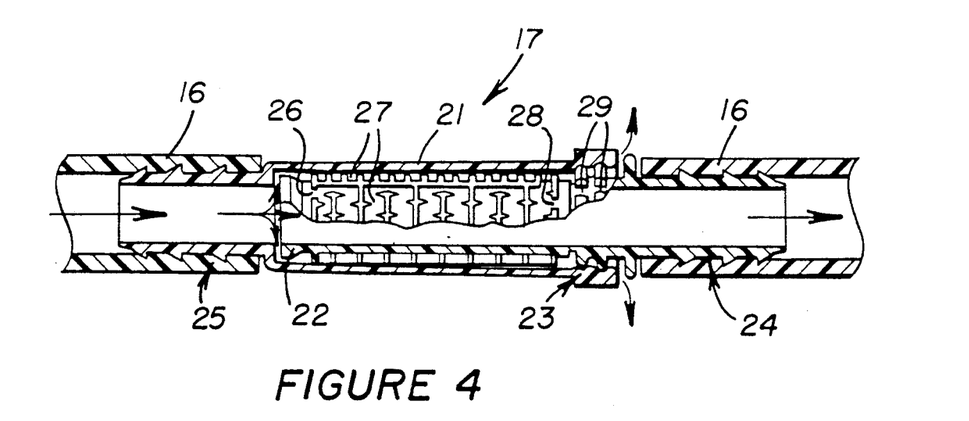
FIG. 4 is an enlarged longitudinal sectional view of one of one type of emitting unit suitable for use in the percolation system of this invention.

FIG. 4 illustrates one type of in-line emitter 17 that can be used in controlled percolation system 10. As shown, the emitter comprises a cylindrical outer housing 21 having a cylindrical inner flow control member 22 snap-fit and held therein by a interengaging flange and groove arrangement 23. Tubes connect in sealing relationship to either side of the emitter 17 at cylindrical barbs 24 and 25.

This general type of emitter (further described in U.S. Pat. No. 3,792,588) is commonly used for drip irrigation purposes. The emitter includes an inlet 26 defined at the upstream end of member 22 to communicate the liquid leaching solution through a labyrinth-type flow passage 27 in a conventional manner, i.e., the flow reverses direction longitudinally, back and forth, throughout its travel through the passages. An outlet 28 is defined at the upstream end of member 22 and passage 27 to permit the solution to flow in a controlled manner from the passage to outlet 28 and thence through an outlet passage 29. The solution then seeps out at a predetermined flow rate between housing 21 and member 22 for distribution over pad 11, as shown in FIG. 2. A typical emitter of this type is manufactured by the OreMax Division of Wade Manufacturing Co. of Fresno, California and can be pre-calibrated and constructed to have a flow rate selected from the range of from 0.2 gph to 6.0 gph.

Other types of emitters can be substituted in lieu of emitter 17, so long as they provide the abovedescribed controlled and substantially uniform rate of distribution of the leaching solution over the pad. For example, the well-known "In-Line," Micro-Flapper Emitter (Model MF) or the "On-Line (Button) Emitter", all manufactured by Wade Manufacturing Co. of Fresno, CA may prove useful for this purpose. Emitters of these type are normally clog resistant (self-cleaning) and pressure compensating to ensure continuous and uniform distribution of the leaching solution over the pad.

The composite average flow rate from the array of emitters 17 is preferably at a rate selected from the approximate range of from 0.05 to 1.50 gph/ft$^2$ of the surface area of ore bed 11. A more limited preferred range is from 0.06 to 1.20 gph/ft$^2$. As suggested above, each emitter 17 preferably has a flow rate selected from the approximate range of 0.2 gph to 6.0 gph and still more preferably within the range of from 0.5 to 5.0 gph.

As shown in FIG. 1, each series of tubes 16 and emitters 17 are preferably positioned to form at least generally parallel lines separated one from another at a distance selected from the approximate range of from 1.0 ft. to 12.0 ft. The emitters are spaced apart one from another on each of the tubes at a linear distance preferably selected from the approximate range of from 1.0 ft. to 12.0 ft. As shown in FIG. 3, the majority of the emitters in one tube are preferably staggered relative to the emitters in the next adjacent, parallel line of emitters to further aid in the substantially uniform saturation of ore bed 11 with the solution.

The rate at which the leaching solution is distributed over a unit area of the pad will depend on a number of predetermined design and related factors, such as the viscosity of the leaching solution, the size of the outlet of each of the emitters and the spacing of the emitters relative to each other. The required time of contact of the leaching solution with the ore bed will be largely determined by the degree of pulverization of the ore, the strength of the leaching solution, the degree of solubility of the mineral or the form in which it occurs, and the effectiveness of the contact. Such contact time may be from four hours to sixty days with many of the applications requiring from seven to forty-five days. In many instances the process can be accelerated by heating the leaching solution and/or by aeration wherein air is injected and mixed with the solution prior to or during its distribution over the pad.

Figure 5:
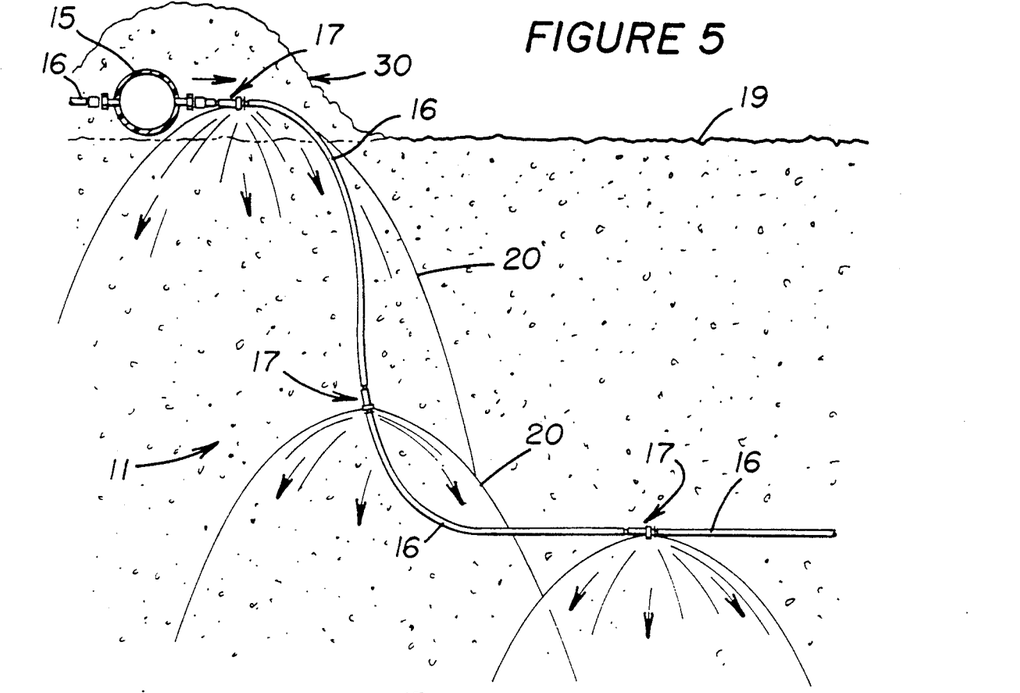
FIG. 5 is a cross-sectional view, similar to FIG. 2, but illustrating the tube and emitters positioned beneath an upper surface of the ore bed.

FIG. 5 illustrates positioning the major portions of tubes 16 and emitters 17 at least substantially beneath upper surface 19 of ore bed 11, preferably at an approximate depth of from 4.0 in. to 72.0 in. Additional piles or heaps 30 of ore bed 11 can be used to cover header pipes 15, as well as the tube portions and emitters disposed above surface 19. This modified system is particularly useful for the percolation process when ambient temperatures fall below freezing.

Figure 6:
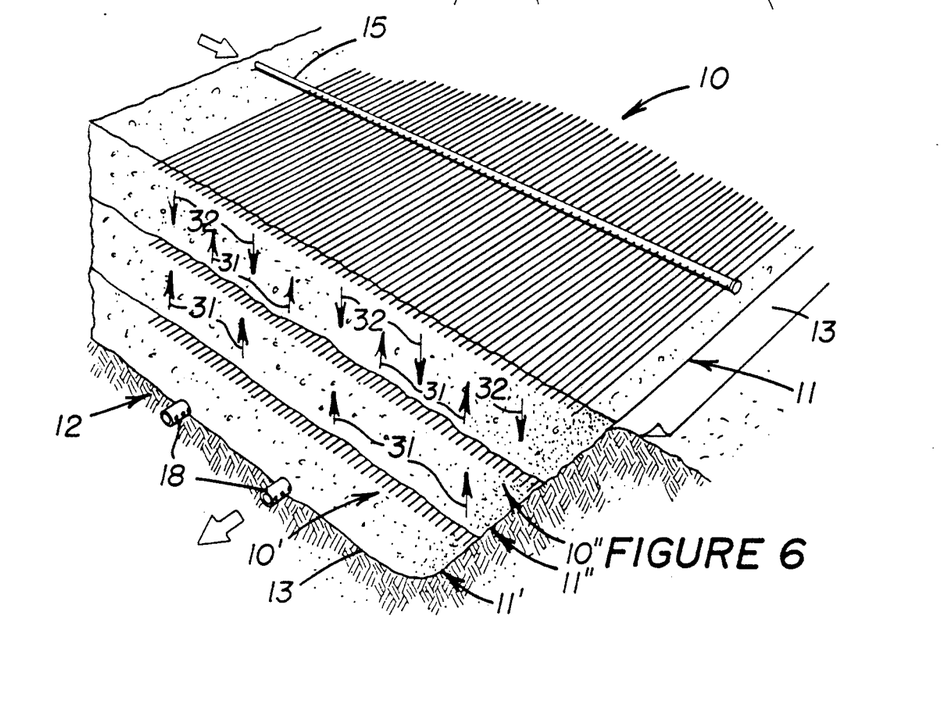
FIG. 6 is similar to FIG. 1, but illustrates multiple layers of ore beds having the percolation system disposed thereon.

FIG. 6 illustrates a further modification and use of the system wherein multiple layers ("lifts") of underlying and previously processed ore beds 11' and 11" are covered with another ore bed 11, processed with the addition of air injection. In particular, after first and second ore beds 11' and 11" have been sequentially processed in the above-described manner, newly deposited ore bed 11 can be processed in a like manner by system 10. Underlying systems 10' and/or 10" are left intact and can be supplied with injected pressurized air (in lieu of the leaching solution) to enhance oxidation (arrows 31) of the leaching solution emitted from system 10 (arrows 32). This added feature will not only aid in increasing the percolation efficiency of the leaching solution, but will also aid in the further solubilization of metals from previously processed ore beds 11' and 11".

From the above description it can be appreciated that this invention constitutes a marked improvement over conventional percolation systems for heap leach mining which include sprayers mounted above an ore bed to spray a leaching solution onto the ore bed. The system and method of this invention function to emit and distribute a leaching solution in an uniform and controlled manner to render it far less susceptible to evaporation and degradation by its exposure to ultra-violet rays. Constant monitoring and replenishing of the leaching solution with added water and/or sodium cyanide is thus normally not required. Evaporation is further deterred since the bulk of the leaching solution is not exposed to wind friction.

Inducement of ice build-up over the pad in freezing weather is also substantially eliminated (particularly with use of the FIG. 5 system) whereby the need for expensive supplemental heat input is eliminated and operation shut-down or a risk of wash-out or blow-out do not pose problems. Elimination of the wind factor also provides a safe working environment for operating and maintenance personnel. Contamination of the surrounding environment (air, ground water, soil) with the highly toxic leaching solution is also eliminated to thus materially enhance the quality of such environment. The cost savings realized with the use of this invention have proved substantial (e.g., twenty-five cents per ounce of recovered silver). It should be understood that system 10 could be covered with an insulative blanket, such as plastic sheets to further enhance the system's efficiency in certain applications.

I claim:

1. A method for percolating a leaching solution in a controlled manner through an ore bed composed of granular metal-laden ore positioned on an impervious pad composed of material impervious to liquid comprising the steps of supplying and conducting a leaching solution adjacent to said ore bed,
communicating said leaching solution to a plurality of tubes positioned in laterally spaced relationship relative to each other,
calibrating a plurality of emitters to have predetermined flow rates to provide a plurality of pre-calibrated emitters,
connecting said emitters in communicating and spaced relationship along each of said tubes,
dispersing said leaching solution across said ore bed from said plurality of pre-calibrated emitters, and
emitting said leaching solution from said emitters directly and collectively into said ore bed at said predetermined flow rates and in overlapping patterns at controlled and substantially uniform seepage rates without projecting said leaching solution to any substantial extent above said ore bed and without causing said leaching solution to pond thereon.

2. The method of claim 1 wherein said leaching solution is emitted at a composite average flow rate selected from the approximate range of from 0.05 to 1.50 gph/ft$^2$ of surface area of said ore bed.

3. The method of claim 2 wherein said range is from 0.06 to 1.20 gph/ft$^2$.

4. The method of claim 2 further comprising positioning said emitters to at least generally to form parallel lines of emitters laterally separated from each other at a distance selected from the approximate range of from 1.0 ft. to 12.0 ft.

5. The method of claim 4 further comprising spacing a plurality of emitters longitudinally one from another on each of said lines of emitters at a distance selected from the approximate range of from 1.0 ft. to 12.0 ft.

6. The method of claim 2 wherein said leaching solution is emitted from each of said emitters at a flow rate selected from the approximate range of from 0.2 gph to 6.0 gph.

7. The method of claim 2 further comprising placing said emitters in direct contact on an upper surface of said ore bed.

8. The method of claim 2 further comprising placing at least a substantial number of said emitters beneath an upper surface of said ore bed at an approximate depth of from 4.0 in. to 72.0 in.

9. The method of claim 1 wherein an aqueous solution of sodium cyanide or potassium cyanide or sulfuric acid is emitted directly into said ore bed.

10. The method of claim 1 further comprising depositing a second ore bed on said first-mentioned ore bed and injecting pressurized air between and into at least one of said ore beds while simultaneously emitting said leaching solution directly into said second ore bed.

* * * * *

(12) EX PARTE REEXAMINATION CERTIFICATE (5479th)
United States Patent
Krauth (10) Number: US 5,030,279 C1
(45) Certificate Issued: Aug. 29, 2006

(54) CONTROLLED PERCOLATION METHOD FOR HEAP LEACH MINING

(75) Inventor: Richard G. Krauth, Fresno, CA (US)

(73) Assignee: R.M. Wade & Co., Tualatin, OR (US)

Reexamination Request:
No. 90/007,248, Oct. 5, 2004

Reexamination Certificate for:
Patent No.: 5,030,279
Issued: Jul. 9, 1991
Appl. No.: 07/646,658
Filed: Jan. 28, 1991

Related U.S. Application Data (62) Division of application No. 07/560,369, filed on Jul. 30, 1990, now Pat. No. 5,005,806, which is a continuation of application No. 07/116,465, filed on Nov. 3, 1987, now abandoned.

(51) Int. Cl.
*E21B 43/28* (2006.01)

(52) U.S. Cl. .......................................... 75/712; 266/101
(58) Field of Classification Search ....................... None
See application file for complete search history.

(56) References Cited

U.S. PATENT DOCUMENTS

| | | | |
|---|---|---|---|
| 3,792,588 A | | 2/1974 | Gilaad |
| 4,017,309 A | * | 4/1977 | Johnson .......................... 299/5 |
| 4,022,384 A | | 5/1977 | Hoyle et al. |
| 4,091,070 A | * | 5/1978 | Riggs et al. .................. 423/41 |

OTHER PUBLICATIONS 1978 report by William Rudy, Metallurgist for the Cyprus Johnson Copper Company, entitled "Heap Leaching at Cyprus Johnson" ("1978 Rudy report"), Dec. 1978.

Nov., 1980 articles by George M. Potter, Paul D. Chamberlin, C. Arthur Lefler, and Harold J. Heinen, published in *Nevada Bureau of Mines & Geology Report 36* entitled "Papers Given at the Precious–Metals Symposium, Sparks, Nevada" ("1980 symposium papers").

Mar., 1981 article by George M. Potter entitled "Design Factors for Heap Leaching Operations," which appeared in *Mining Engineering* ("1981 Potter article").

1983 Mountain States Research & Development report entitled "Metallurgical Testing of Mesquite Project Gold Ores," prepared for Gold Fields Mining Corporation ("1983 MSR report"), Dec. 1983.

1983 article by W. Joseph Schlitt entitled "The Role of Solution Management in Heap and Dump Leaching," published in *Proceedings of the 1983 SME Fall Meeting "Au & Ag Heap and Dump Leaching Practice"* ("1983 Schlitt article"), Dec. 1983.

1984 article by Peter G. Chamberlain et al. entitled "Gold and Silver Leaching Practices in the United States," published in *U.S. Dept. of the Interior Bureau of Mines Information 1984 Circular* ("1984 Chamberlain article"), Dec. 1984.

(Continued)

*Primary Examiner*—Kiley S. Stoner (57) ABSTRACT

A system for heap leach mining comprises supply and header pipes for conducting leaching solution alongside a bed or "heap" of crushed metal-laden ore deposited on an impervious pad. A series of spaced tubes are connected to the supply header pipes to extend transversely thereof, over the pad, to receive the leaching solution therefrom. A plurality of emitters are connected in spaced relationship along each of the tubes for emitting the leaching solution at a controlled and substantially uniform rate over the pad and into the ore bed. The tubes and emitters can be positioned either on an upper surface of the ore bed or buried beneath such surface, at a predetermined depth. The system and method of this invention provide numerous advantages over conventional surface spraying systems and methods, including substantial cost savings thereover.

OTHER PUBLICATIONS

Mar., 1986 article by Jorge Perez Fuentes entitled "Lixiviacion de los Ripios de Chuquicamata" (translated into English as "Lixiviation of the Gangue Deposits in Chuquicamata"), *Mineria Chilena* No. 61 ("1986 Fuentes article"), Dec. 1986.

1984 article by David Menne entitled "Heap Leaching," published in *Proceedings of the Perth and Kalgoorlie Branches of the Australian Institute of Mining and Metallurgy Regional Conference on "Gold–Mining, Metallurgy and Geology"* ("1984 Menne article"), Dec. 1984.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *